(12) United States Patent
Grebe et al.

(10) Patent No.: US 10,059,317 B2
(45) Date of Patent: Aug. 28, 2018

(54) PRESSURE CONTROL VALVE ARRANGEMENT HAVING AN ECCENTRICALLY MOUNTED DOUBLE MAGNET

(71) Applicant: Knorr-Bremse Systeme Fur Nutzfahrzeuge GMBH, Munich (DE)

(72) Inventors: Jan Grebe, Starnberg (DE); Dirk Brenner, Stuttgart (DE); Jochen Weippert, Munich (DE); Wolfgang Rohn, Munich (DE); Harald Jaehns, Munich (DE)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/369,926

(22) Filed: Dec. 6, 2016

(65) Prior Publication Data

US 2017/0120881 A1    May 4, 2017

Related U.S. Application Data

(63) Continuation of application No. 13/381,039, filed as application No. PCT/EP2010/058985 on Jun. 24, 2010.

(30) Foreign Application Priority Data

Jun. 29, 2009 (DE) .................. 10 2009 030 898

(51) Int. Cl.
*B60T 8/34* (2006.01)
*B60T 8/36* (2006.01)
(Continued)

(52) U.S. Cl.
CPC .......... *B60T 8/3605* (2013.01); *B60T 15/027* (2013.01); *F16K 7/17* (2013.01); *F16K 27/0263* (2013.01); *F16K 31/0675* (2013.01)

(58) Field of Classification Search
CPC ...... B60T 8/3605; B60T 15/027; B60T 8/342; B60T 8/3675; B60T 8/5087; B60T 15/02
(Continued)

(56) References Cited

U.S. PATENT DOCUMENTS 3,416,843 A * 12/1968 Kobnick ............... B60T 8/1831
137/627.5
3,826,283 A *  7/1974 Klimek .................. B60T 15/02
137/627.5
(Continued)

FOREIGN PATENT DOCUMENTS

JP          08175353 A *  7/1996  ............ B60T 8/3605

*Primary Examiner* — Xuan Lan Nguyen
(74) *Attorney, Agent, or Firm* — Cheryl L. Greenly; Brian E. Kondas; Eugene E. Clair

(57) ABSTRACT

A pressure control valve arrangement for controlling fluid pressure in a brake system of a vehicle includes two diaphragm valves and two electromagnetic control valves, activatable by an electronic control device, for the pilot control of the diaphragm valves. The two electromagnetic control valves have a double magnet with two magnet coils and magnet armatures and are actuatable by current being applied to the magnet coils. The housing has at least one pressure medium connection, connected to a service brake valve, for acting with pressure upon and/or relieving the pressure of the pressure control valve arrangement and at least one connection for connecting to a brake cylinder. A plane of symmetry of the mid-axes of the magnet coils of the double magnet is arranged in parallel and offset by the amount of an eccentricity, with respect to a mid-axis of the pressure medium connection.

14 Claims, 5 Drawing Sheets

(51) Int. Cl.
*B60T 15/02* (2006.01)
*F16K 7/17* (2006.01)
*F16K 31/06* (2006.01)
*F16K 27/02* (2006.01)

(58) Field of Classification Search
USPC .......... 303/118.1, 50, 56; 188/153 D, 153 R
See application file for complete search history.

(56) References Cited

U.S. PATENT DOCUMENTS

| | | | | |
|---|---|---|---|---|
| 3,853,357 | A | * | 12/1974 | Hitzelberger ......... B60T 8/5012 |
| | | | | 188/181 A |
| 4,230,377 | A | * | 10/1980 | Goebels ................. B60T 8/343 |
| | | | | 303/118.1 |
| 5,374,114 | A | * | 12/1994 | Burgdorf ............... B60T 8/3675 |
| | | | | 303/113.1 |
| 2011/0132475 | A1 | * | 6/2011 | Eidenschink ......... B60T 8/3605 |
| | | | | 137/487.5 |

* cited by examiner

PRESSURE CONTROL VALVE ARRANGEMENT HAVING AN ECCENTRICALLY MOUNTED DOUBLE MAGNET

RELATED APPLICATION INFORMATION

The present application is a continuation of U.S. patent application Ser. No. 13/381,039 "Pressure Control Valve Arrangement Having an Eccentrically Mounted Double Magnet" filed on Apr. 2, 2012, which claims priority to and the benefit of German patent application no. 10 2009 030 898.9, which was filed in Germany on Jun. 29, 2009, the disclosure of which is incorporated herein by reference.

FIELD OF THE INVENTION

The present invention relates to a pressure control valve arrangement for controlling the fluid pressure in an ABS brake system of a vehicle.

BACKGROUND

ABS (antilock system) prevents the wheels from locking and comes into operation when greater adhesion than is transferable is demanded between a tire and the road, that is to say when the driver overbrakes. In overbraking, the central electronic control apparatus of the ABS brake system detects from rotational speed sensor signals the tendency of one or more wheels to lock and from this calculates the activation of the pressure control valve arrangement acting upon the assigned brake cylinder. The brake pressure is then set to optimal slip by the pressure control valve arrangement by lowering, holding or building up the brake pressure according to the wheel behavior and therefore the frictional conditions between the tire and road. ABS pressure control valve arrangements without a relay action, to which the exemplary embodiments and/or exemplary methods of the present invention relate, are used in vehicles, such as, for example, utility vehicles, omnibuses, tractors and trailers. Pressure control valve arrangements without a relay action mostly have 3/2 way solenoid valves as the pilot control valves of diaphragm valves, an electronic control device activating the 3/2 way solenoid valves so that the "pressure holding", "pressure reduction" and the "pressure build-up" functions necessary for ABS operation can be carried out. During braking without the response of the ABS (no tendency of a wheel to lock), the pressure medium, mostly air, flows, unimpeded, through the pressure control valve arrangements in both directions when the brake cylinders are being ventilated and bled. This ensures that the functioning of the service brake system is not influenced by the ABS pressure control valve arrangement.

Pressure control valves of the generic type, as 1-channel pressure control valves for antilock systems in motor vehicles, have in each case, inside the housing, a diaphragm valve as a holding valve and as an outlet valve and also in each case an electromagnetic control valve for the holding valve and the outlet valve. The two diaphragm valves contain in each case a diaphragm capable of being acted upon by the pressure in a pilot control space, the pilot control space being closed outwardly by a cover fastened to the housing. A generic pressure control valve arrangement of an ABS brake system is known, for example, from EP 0 266 555 A1 or from DE-A 2 855 876. In the pressure control valve arrangements of the prior art, the housing has a pressure medium connection for the action of pressure and/or the relief of pressure, which is connected to a foot-operated brake valve. Furthermore, the two diaphragm valves are arranged laterally on the housing, the corresponding pilot control spaces being closed by covers fastened laterally to the housing, that is to say, there, surface normals on the diaphragms of both diaphragm valves are arranged perpendicularly to the mid-axis of the pressure medium connection.

Furthermore, in the published references, particularly according to FIG. 1 of DE-A-2 855 876, a plane of symmetry of the mid-axes of the magnet coils of the double magnet of the two electromagnetic control valves is arranged centrically with respect to a mid-axis of the pressure medium connection (there, the pressure medium inlet). In this case, the mid-axes of the two magnet coils at the same time also define the positions of the valve seats of the electromagnetic control valves of the pressure control valve arrangement, because the mid-axes of the magnet coils are arranged coaxially with the valve seats and with the magnet armatures. Furthermore, the valve seats of the electromagnetic control valves are connected to the pressure medium connection or issue into this via pressure medium ducts. These pressure medium ducts may be made coaxially with the mid-axes of the magnet coils by cutting manufacture, such as drilling, in order for reasons of cost to avoid having to rechuck the housing in order to make obliquely running pressure medium ducts or housing bores. The pressure medium ducts consequently run parallel to one another in a vertical direction.

So that the pressure medium ducts emanating from the valve seats of the electromagnetic control valves can therefore be manufactured in a vertical direction in the housing by cutting and at the same time both of them can issue into the pressure medium connection, the inside diameter of the pressure medium connection has to be relatively large, especially since the magnet coils also cannot undershoot a certain diameter. However, because a correspondingly large diameter of the pressure medium connection is unfavorable in flow terms, in practice a reducing sleeve which reduces the effective flow diameter is inserted into the pressure medium connection.

However, this procedure entails additional costs for producing and mounting the reducing sleeve, and, in view of the large number of pressure control valve arrangements delivered by a supplier of vehicles, this amounts in total to a relatively high sum.

SUMMARY OF THE INVENTION

The subject on which the exemplary embodiments and/or exemplary methods of the present invention are based is to develop a pressure control valve arrangement of the type initially mentioned in such a way that it can be manufactured and assembled more simply and more cost-effectively.

This object may be achieved, according to the exemplary embodiments and/or exemplary methods of the present invention, by the features described herein.

As explained initially, the mid-axes of the magnet coils are coaxial with the valve seats of the electromagnetic control valves, and in each case one valve seat is formed at one end of a pressure medium duct which connects the respective valve seat to the pressure medium connection. Since two electromagnetic control valves are present, two pressure medium ducts formed in the housing must consequently lead from the respective valve seats coaxial with the mid-axes of the magnet coils into the pressure medium connection. In this case, pressure medium ducts running obliquely, that is to say deviatingly from a vertical or from a horizontal, are to be avoided, so as to avoid having to rechuck the housing during manufacture.

The exemplary embodiments and/or exemplary methods of the present invention achieve this object by providing that a plane of symmetry of the mid-axes of the magnet coils of the double magnet of the two electromagnetic control valves is arranged parallel and eccentrically with respect to a mid-axis of the pressure medium connection.

The distance between the mouth of the connecting duct, arranged in the housing, in the pressure medium connection between the valve seat of one of the electromagnetic control valves and the pressure medium connection, on the one hand, and the mid-axis of the pressure medium connection, on the other hand, is then reduced, as compared with the prior art, because the mid-axis of one of the magnet coils of the double magnet and therefore also the valve seat, coaxial thereto, of the respective electromagnetic control valve and, too, the respective pressure medium duct can then be moved nearer to the mid-axis of the pressure medium connection and consequently issue into the pressure medium connection at a shorter distance from this mid-axis. The other pressure medium duct emanating from the valve seat of the other electromagnetic control valve then no longer needs to run parallel to the first, for example vertical pressure medium duct, but instead can issue, for example running in a horizontal direction, into an annular duct which is formed in a housing and which is connected in turn to the pressure medium connection. The pressure medium ducts then run in a vertical and a horizontal direction, so that the housing does not have to be rechucked during manufacture. The diameter of the pressure medium connection can thus be smaller and therefore more favorable in flow terms. In particular, a reducing sleeve can be dispensed with.

Advantageous developments and improvements of the exemplary embodiments and/or exemplary methods of the present invention specified herein are possible as a result of the measures listed in the further descriptions herein.

Especially, the housing may be provided with at least one through bore which issues in side faces of the housing and which is intended as a holding arrangement for holding the pressure control valve arrangement on a carrier body, the plane of symmetry of the mid-axes of the magnet coils of the double magnet of the two electromagnetic control valves being arranged, offset by the amount of the eccentricity with respect to a plane of symmetry of the through bore, said plane of symmetry being arranged perpendicularly to a mid-axis of the through bore. As a result, the eccentric arrangement of the double magnet acquires an additional reference to a relevant geometric quantity of the pressure control valve arrangement, because the length of the through bore is fixed, for reasons of space, as a standardized installation dimension of the pressure control valve arrangement and is invariable. It defines the maximum width of the housing.

According to a development, in one diaphragm valve of the two diaphragm valves, the surface normal running perpendicularly with respect to the assigned diaphragm is arranged parallel to the mid-axis of the through bore and perpendicularly to the mid-axis of the pressure medium connection, and, in the other diaphragm valve, the surface normal running perpendicularly with respect to the assigned diaphragm is arranged perpendicularly to the mid-axis of the through bore and perpendicularly to the mid-axis of the pressure medium connection. This may be implemented, for example, in that one diaphragm valve is arranged laterally and the other diaphragm valve on the bottom side or head side on the housing.

If a cover closing a pilot control space of one diaphragm valve, for example arranged laterally on a housing, with respect to the outside and fastened to the housing is then composed of at least one plastic, the wall thickness of this cover can be greater than in the prior art, in which both diaphragm valves are arranged laterally on the housing and, because of the standardized overall width of the housing, the thickness of the covers has to be smaller. The plastic cover which is thicker, as compared with the prior art, is then more rigid. The tendency of the cover to deformation therefore decreases, and so the safety of the respective diaphragm valve against leakage of the pilot control space is increased.

A cover closing a pilot control space of the other diaphragm valve with respect to the outside and fastened to the housing may likewise be composed of a plastic.

In this case, at least one of the covers may at the same time, with the effect of an advantageous double function, close a pressure medium duct formed in the housing and separated from the respective pilot control space.

The pressure medium connection may be provided, in particular, for connection to a service brake valve of a pressure medium-actuated brake apparatus of a vehicle.

Further measures improving the exemplary embodiments and/or exemplary methods of the present invention are illustrated in more detail below, together with the description of an exemplary embodiment of the present invention, by the drawings.

DETAILED DESCRIPTION

Figure 1:
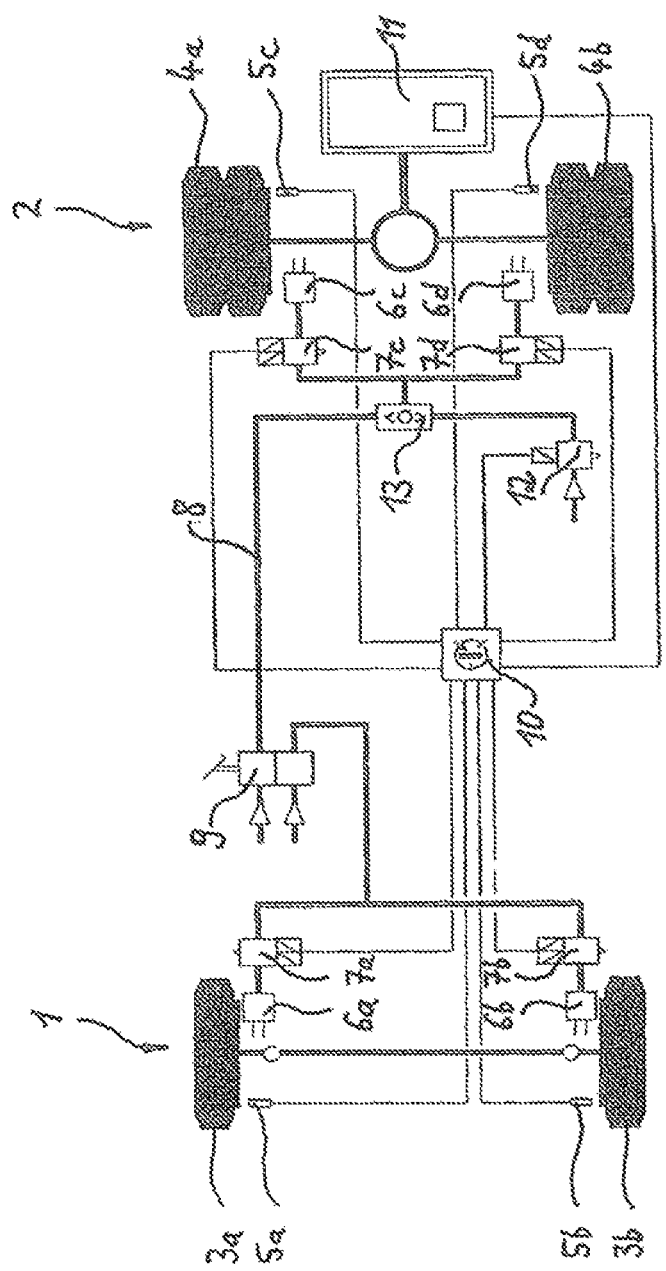
FIG. 1 shows a basic illustration of an ABS brake system as a general diagram of a 4S/4C ABS brake system of a vehicle.

FIG. 1 According to FIG. 1, a vehicle equipped with an ABS brake system has a front axle 1 and a rear axle 2. Wheels 3a and 3b are arranged on the front axle 1; the rear axle 2 has, for example, wheels 4a and 4b in each case equipped with twin tires. The ABS brake system serving for braking these wheels 3a, 3b and 4a, 4b is designed here in the manner of a 4S/4C system (four sensors, four channels). This means that, overall, four rotational speed sensors 5a-5d and four pressure control valve arrangements 7a-7d are available here. The pressure control valve arrangements 7a-7d serve for the activation of respectively assigned brake cylinders 6a-6d. All the pressure control valve arrangements 7a-7d are connected to a foot-operated brake valve 9 via a branching pneumatic brake pressure line 8.

The driver, when actuating the foot-operated brake valve 9, generates a brake pressure which, passing through the pressure control valve arrangements 7a-7d, is transferred by the pneumatic brake pressure line 8 to the brake cylinders 6a-6d assigned to the wheels 3a, 3b and to the wheels 4a, 4b.

Figure 2A:
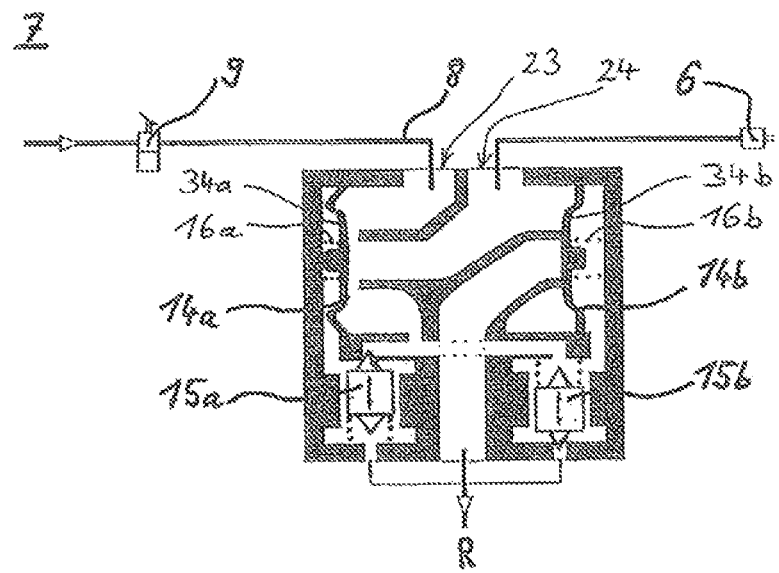
FIG. 2a shows a diagrammatical illustration of a pressure control valve arrangement activating a brake cylinder, in the open state (pressure build-up).
Figure 2B:
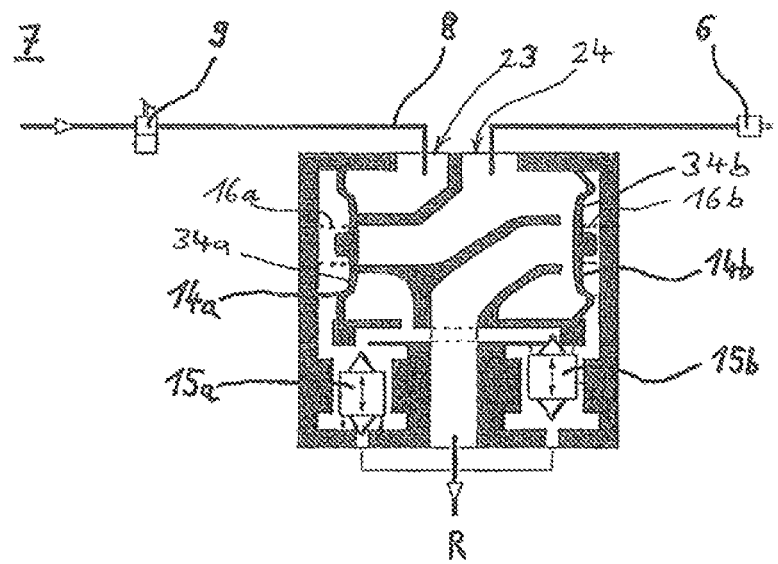
FIG. 2b shows a diagrammatic illustration of the pressure control valve arrangement of FIG. 2a in the closed state (pressure reduction).
Figure 4:
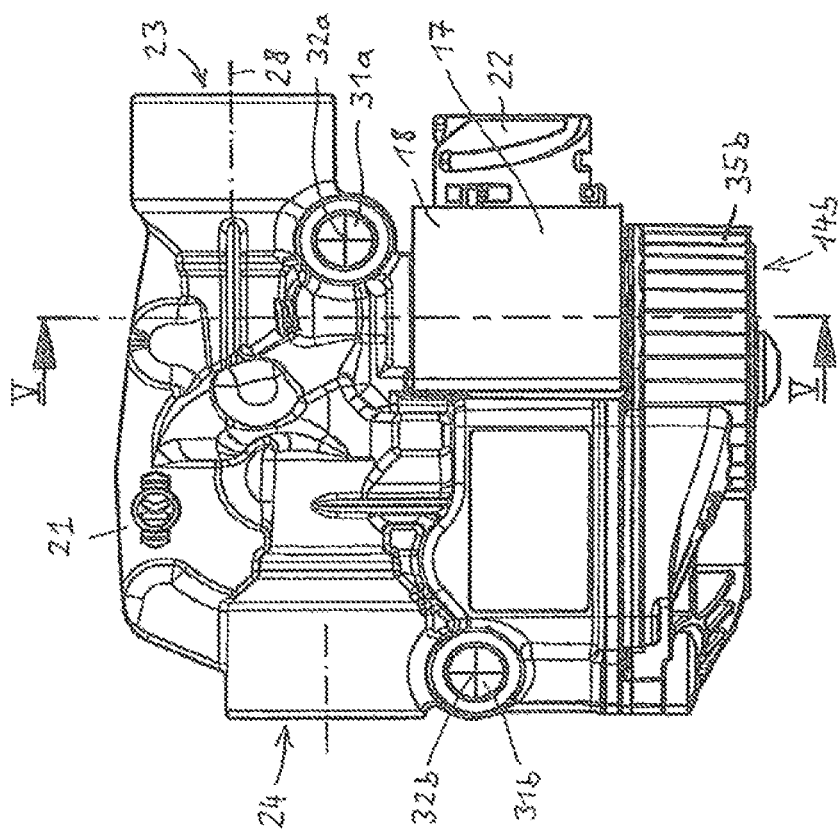
FIG. 4 shows a side view of the pressure control valve arrangement of FIG. 3.

The pressure control valve arrangements 7a-7d are activatable via integrated electromagnetic valves 15a, 15b shown in FIG. 2a, FIG. 2b and FIG. 4 and for this purpose are connected electrically to a central electronic control unit 10. The electronic control unit 10 is connected on the input side to the four rotational speed sensors 5a-5b determining the wheel speeds. In the event of the locking of a wheel 3a-3d, the brake pressure selected by the driver via the foot-operated brake valve 9 is lowered correspondingly to an ABS control, according to the electronic control unit 10, by the corresponding pressure control valve arrangements 7a-7d until locking is eliminated. The ABS brake system of the present exemplary embodiment comprises, furthermore, an ASR function which comprises an ASR unit 11 for reducing the engine torque, such as an ASR solenoid valve 12 and a shuttle valve 13.

The pressure control valve arrangement 7 used according to FIG. 2a within the framework of the ABS brake system for the purpose of ABS control is constructed here in the manner of a 1-channel pressure control valve arrangement and is composed essentially of two integrated diaphragm valves 14a and 14b and of two spring-loaded electromagnetic valves 15a, 15b activating these. The diaphragm valves 14a and 14b are in each case loaded in the closing direction by spring elements 16a, 16b and are pilot-controlled via the respectively assigned electromagnetic valves 15a and 15b.

A pressure control valve arrangement 7 is shown in FIG. 2a in its open position, in which a build-up of pressure to the connected brake cylinder 6 takes place. In this case, neither of the solenoid valves 15a and 15b is activated electrically. In the position shown, the compressed air coming from the foot-operated brake valve 9 presses onto the diaphragm valve 14a designed as an inlet valve. The normally closed electromagnetic valve 15a prevents the assigned diaphragm valve 14a from being closed again. By the normally open second electromagnetic valve 15b, the brake pressure coming from the foot-operated brake valve 9 closes the second diaphragm valve 14b serving as an outlet valve. The compressed air thus runs, unimpeded, through the pressure control valve arrangement 7. The pressure control valve arrangement 7 is in this state even when ABS control does not take place.

To keep the brake pressure constant in a brake cylinder 6a to 6d, current merely has to be applied to the electromagnetic valve 15a, with the result that this opens and consequently the brake pressure coming from the foot-operated brake valves 9 presses the inlet-side diaphragm valve 14a shut. The pressure on the right and the left side of the diaphragm valve 14a is then equal. However, since the active surface on the left side of the diaphragm valve 14a is greater, the diaphragm valve 14a is closed. The same applies correspondingly to the outlet-side diaphragm valve 14b activated via the electromagnetic valve 15b. To keep the pressure constant, therefore, the pressure control valve arrangement 7 closes the pneumatic brake pressure line 8 running from the foot-operated brake valve 9 to the brake cylinder 6.

According to FIG. 2b, a pressure reduction in a brake cylinder 6a to 6d is achieved in that current is applied to both electromagnetic valves 15a and 15b. What was described above for holding the pressure applies to the electromagnetic valve 15a and the assigned inlet-side diaphragm valve 15a. By contrast, the other electromagnetic valve 15b, by having current applied to it, is closed. The pressure coming from the brake cylinder 6 therefore presses the outlet-side diaphragm valve 14b open and the brake cylinder 6 is bled.

The above-described functions of the pressure control valve arrangement 7 are carried out according to the electronic control unit 10, within the framework of ABS/ASR control, in the way described initially.

Figure 3:
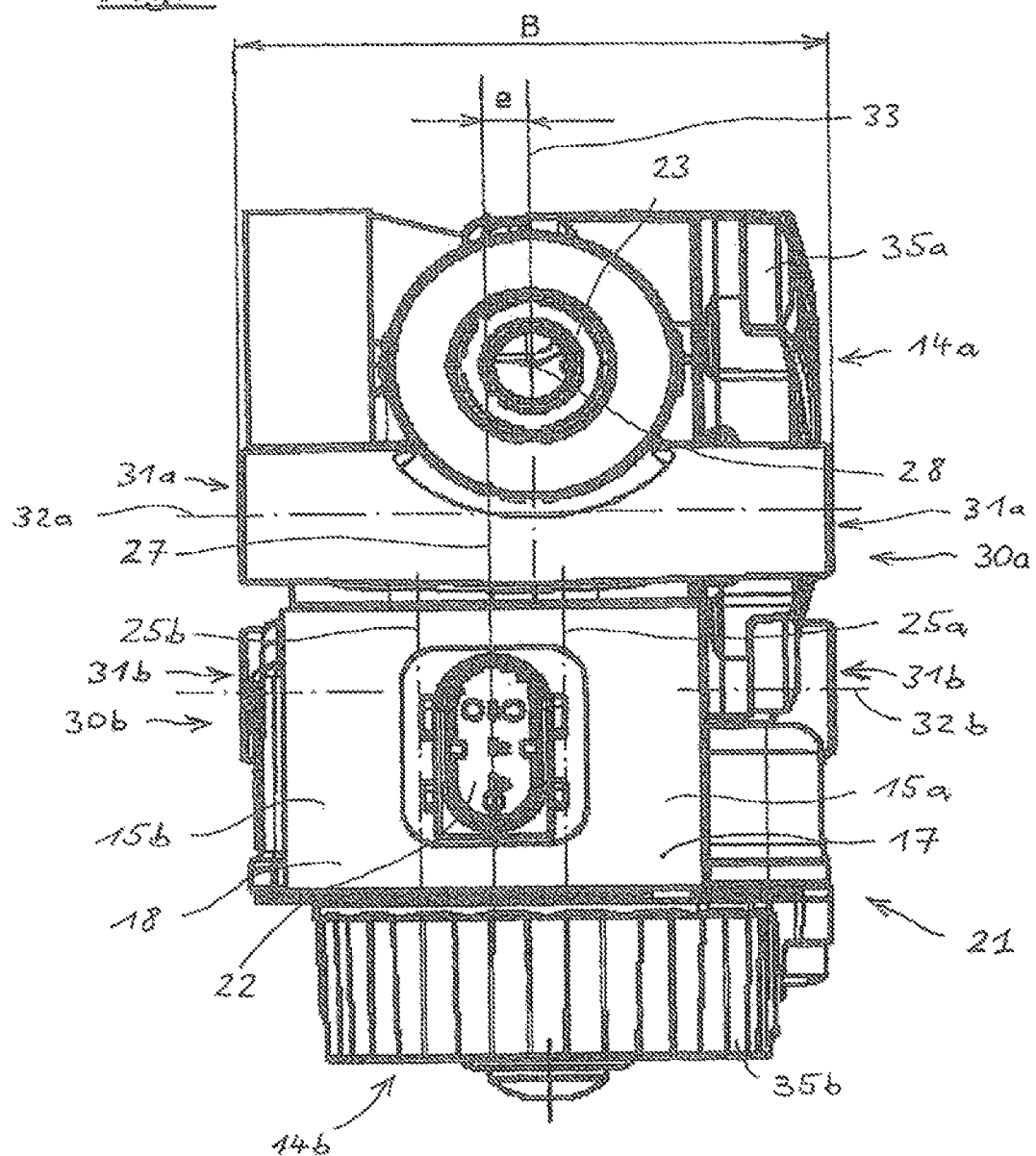
FIG. 3 shows a front view of an actual version of the pressure control valve arrangement of FIG. 2a and FIG. 2b according to an exemplary embodiment of the present invention.
Figure 5:
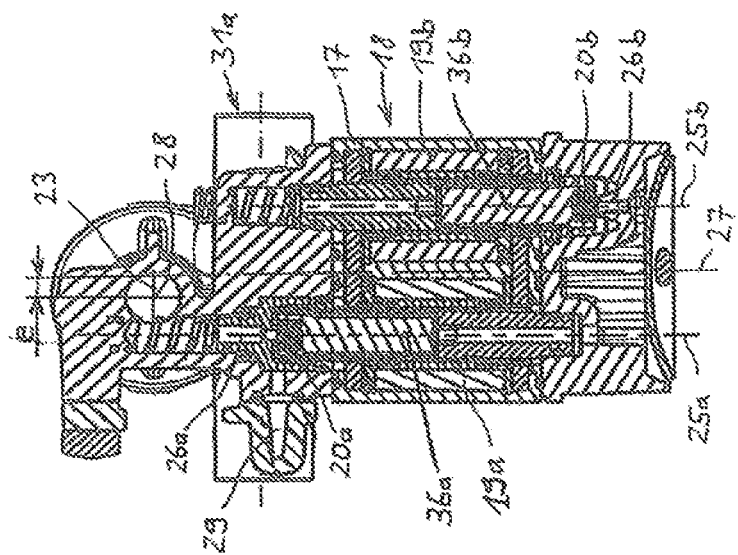
FIG. 5 shows a sectional illustration along the line V-V of FIG. 4.

FIG. 3 to FIG. 5 show the pressure control valve arrangement 7 illustrated merely diagrammatically in FIG. 2a and FIG. 2b in an actual embodiment in the installation position, that is to say the components illustrated at the top are located at the top. In this embodiment, the two electromagnetic valves 15a, 15b for the pilot control of the diaphragm valves 14a, 14b are combined in a double solenoid valve, the function of which, however, is analogous to that of the individual valves 15a, 15b.

The two electromagnetic valves 15a, 15b have a double magnet 18 combined in a block 17 and having two magnet coils 19a, 19b which cooperate with two solenoid valves seats 20a, 20b. As may be gathered clearly from FIG. 5, magnet armatures 36a, 36b cooperating with the solenoid valves seats 20a, 20b of the electromagnetic valves 15a, 15b are actuated as valve closing members by current being applied to the magnet coils 19a, 19b.

The block 17 comprising the double magnet 18 is fastened, which may be on the front side, to a housing 21 of the pressure control valve arrangement 7 and has a plug connection 22 for supplying current to the double magnet 18. This housing 21 has, furthermore, a pressure medium connection 23 for the action of pressure upon and/or the relief of pressure of the pressure control valve arrangement 7, and also a working connection 24, as can be seen in FIG. 4, for connecting the brake cylinder 6.

As shown in FIG. 2a and FIG. 2b, the pressure medium connection 23 is connected via the brake pressure line 8 to the foot-operated or service brake valve 9 of the pressure medium-actuated brake apparatus and is ventilated or bled according to actuation of the foot-operated brake valve 9.

As many be gathered particularly from FIG. 5, the mid-axes 25a, 25b of the magnet coils 19a, 19b are coaxial with the solenoid valve seats 20a, 20b of the electromagnetic valves 15a, 15b, and in each case one solenoid valve seat 20a, 20b is formed at one end of a pressure medium duct 26a, 26b which connects the respective solenoid valve seat 20a, 20b to the pressure medium connection 23.

A plane of symmetry 27, shown in FIG. 3, of the mid-axes 25a, 25b of the magnet coils 19a, 19b of the double magnet 18 of the two electromagnetic valves 15a, 15b is arranged, offset eccentrically by the amount of an eccentricity e with respect to a mid-axis 28 of the pressure medium connection 23. The mid-axis 28 of the pressure medium connection 23 is parallel with respect to this plane of symmetry 27.

The distance between the mouth of, for example, the pressure medium duct 26 in the pressure medium connection 23 and the mid-axis 28 of the pressure medium connection 23 is then reduced, because the mid-axis 25a of one of the magnet coils 19a of the double magnet 18 and consequently also the solenoid valve seat 20a of the respective electromagnetic valve 15a and also the respective pressure medium duct 26a are then moved nearer to the mid-axis 28 of the pressure medium connection 23, and consequently the pressure medium duct 26a can then issue into the pressure medium connection 23 at a shorter distance from said mid-axis, as shown clearly in FIG. 5. Of course, the double magnet 18 may also be arranged, offset by the amount of an eccentricity e, in the other direction, in FIG. 3 to the right with respect to the mid-axis 28 of the pressure medium connection 23.

According to the eccentricity e, however, the distance of the other pressure medium duct 26b emanating from the solenoid valve seat 20b of the other electromagnetic valve 15b from the mid-axis 28 of the pressure medium connection 23 is increased. This pressure medium duct 26b therefore does not issue directly into the pressure medium connection 23, but instead first, for example, into an annular duct 29 which is formed in the housing 21 and which is connected, in turn, to the pressure medium connection 23. The eccentricity may amount to more than 1 mm.

The housing 21 is provided with at least one, here, for example, two, through bores 31a, 31b which issue into the two side faces 30a, 30b of the housing 21 and through which a project holding arrangement, for example screws, for holding the pressure control valve arrangement on a carrier body, for example on a chassis of the vehicle. The mid-axes 32a, 32b of the two through bores 31a, 31b may be parallel to one another.

In this case, the plane of symmetry 27 of the mid-axes 25a, 25b of the magnet coils 19a, 19b of the double magnet 18 of the two electromagnetic valves 15a, 15b is arranged eccentrically with respect to a plane of symmetry 33 arranged perpendicularly to the mid-axes 32a, 32b of the through bores 31a, 31b, as may be gathered from FIG. 3. In this case, the mid-axis 28 of the pressure medium connection 23 lies in this plane of symmetry. The axial length of the through bores 31a, 31b is deemed a standardized installation dimension of the pressure control valve arrangement 7 and, for reasons of space, is fixed and invariable, and it defines the maximum permissible width B of the housing 21.

Figure 7:
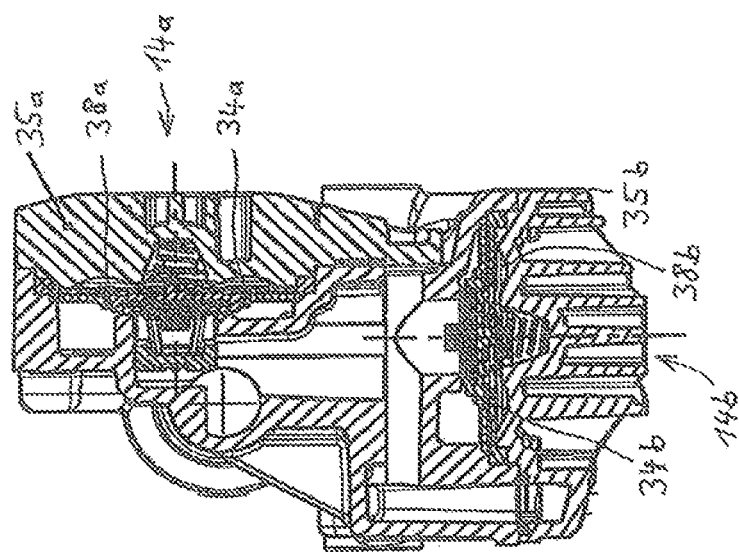
FIG. 7 shows a sectional illustration along the line VII-VII of FIG. 6.
Figure 6:
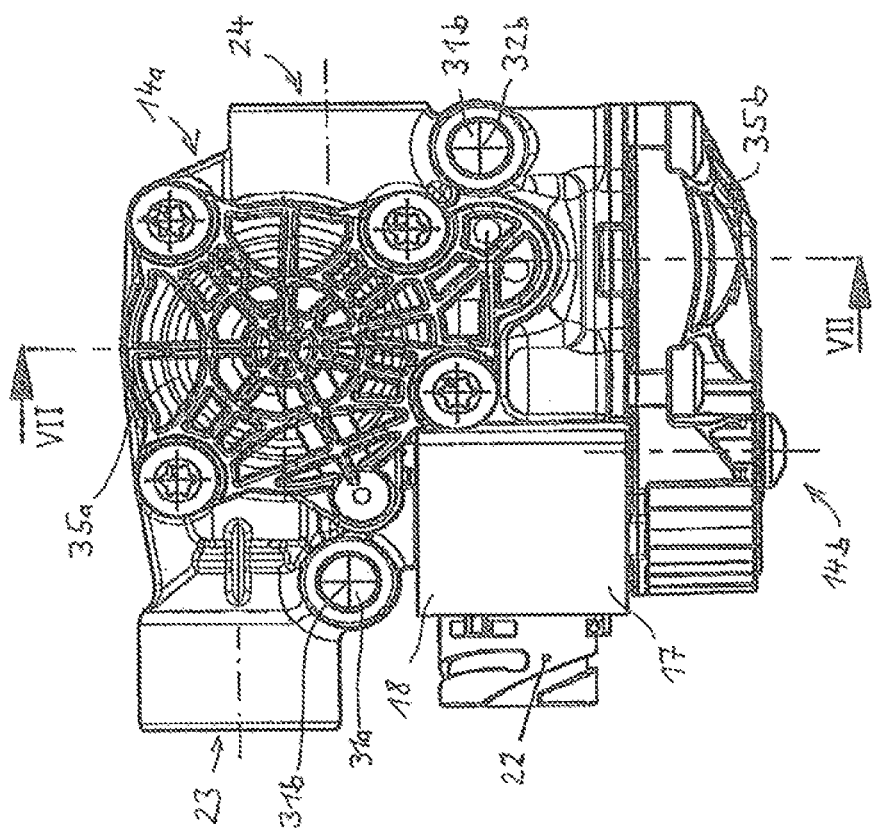
FIG. 6 shows the other side view of the pressure control valve arrangement of FIG. 3.

One diaphragm valve 14a may be arranged laterally and the other diaphragm valve 14b may be arranged on the bottom side on the housing 21, as shown in FIG. 4 and FIG. 7.

Such a diaphragm valve 14a, 14b has, as a valve body, a diaphragm 34a, 34b which can be acted upon by pressure medium being introduced into a control chamber 38a, 38b which is covered in each case on the housing outside by a cover 35a, 35b which is produced by primary forming, such as injection molding, and which is fastened to the housing 21. In this case, the control chamber 38a, 38b is formed between the diaphragm 34a, 34b and the cover 35a, 35b. The covers 35a, 35b may be composed of at least one plastic.

At least one of the covers 35a, 35b may be designed such that, in addition to its function as a closing body for the assigned control chamber 38a, 38b, it at the same time closes a bore which is formed in the housing 21 and is not intended for connection to the control chamber 38a, 38b and which issues into a side face 30a, 30b of the housing 21.

With regard to one diaphragm valve 14a of the two diaphragm valves 14a, 14b, the surface normal running perpendicularly with respect to the assigned diaphragm 34a may be parallel to the mid-axes 32a, 32b of the through bores 31a, 31b and perpendicular to the mid-axis 28 of the pressure medium connection 23, as can easily be imagined from FIG. 3. As regards the other diaphragm valve 14b, by contrast, the surface normal running perpendicularly with respect to the assigned diaphragm 34b is arranged perpendicularly to the mid-axes 32a, 32b of the through bores 31a, 31b and perpendicular to the mid-axis 28 of the pressure medium connection 23. In other words, in the view of FIG. 3, one diaphragm valve 14a is then arranged laterally and the other diaphragm valve 14b on the bottom side or, alternatively, on the head side on the housing 21.

The List of Reference Symbols is as follows:
1 Front axle
2 Rear axle
3 Wheel
4 Wheel
5 Rotational speed sensor
6 Brake cylinder
7 Pressure control valve arrangement
8 Brake pressure line
9 Foot-operated brake valve
10 Control unit
11 ASR unit
12 ASR solenoid valve
13 Shuttle valve
14a/b Diaphragm valve
15a/b Electromagnetic valve
16a/b Spring element
17 Block
18 Double magnet
19a/b Magnet coils
20a/b Solenoid valve seats
21 Housing
22 Plug connection
23 Pressure medium connection
24 Working connection
25a/b Mid-axes magnet coils
26a/b Pressure medium duct
27 Plane of symmetry
28 Mid-axis
29 Annular duct
30a/b Side faces
31a/b Through bores
32a/b Mid-axes
33 Plane of symmetry
34a/b Diaphragm
35a/b Cover
36a/b Magnet armature
38a/b Control chamber

We claim:

1. A pressure control valve for a brake system comprising:
a housing; the housing having a service brake pressure connection having a mid-axis;
a first diaphragm valve in the housing arranged generally parallel to the mid-axis of the service brake pressure connection;
a second diaphragm valve in the housing arranged generally perpendicular to the mid-axis of the service brake pressure connection;
a first electromagnetic valve in the housing having a first magnetic coil;
a second electromagnetic valve in the housing having a second magnetic coil; the first magnetic coil and the second magnetic coil having a coil plane of symmetry parallel to the mid-axis of the service brake pressure connection; wherein the coil plane of symmetry is offset by an eccentricity value with respect to the mid axis of the service brake pressure connection.

2. The pressure control valve of claim 1, the housing further comprising a mounting bore having a mounting bore mid-axis, wherein a mounting bore plane of symmetry is perpendicular to the mounting bore mid-axis and offset by the eccentricity value from the coil plane of symmetry.

3. The pressure control valve of claim 1, wherein the eccentricity value is greater than about one millimeter.

4. The pressure control valve of claim 1, further comprising a first cover, wherein a first control chamber is formed between a first diaphragm of the first diaphragm valve and the first cover.

5. The pressure control valve of claim 4, wherein the first cover is fastened generally laterally onto the housing.

6. The pressure control valve of claim 4, wherein the first cover is composed of plastic.

7. The pressure control valve of claim 4, further comprising a second cover fastened onto the housing, wherein a second control chamber is formed between a second diaphragm of the second diaphragm valve and the second cover.

8. The pressure control valve as in claim 7, wherein the second cover is arranged generally perpendicular from the first cover on the housing.

9. A pressure control valve arrangement for controlling the fluid pressure in an ABS brake system of a vehicle in such a way that, during a tendency of individual wheels of the vehicle to lock, the brake pressure in at least one assigned brake cylinder is matched adaptively, comprising:
two electromagnetic control valves, activatable by an electronic control device provided in a housing of the pressure control valve arrangement,
a first diaphragm valve, a surface running perpendicularly with respect to the first diaphragm valve arranged parallel to the mid-axis of a through bore and perpendicularly to a mid-axis of a pressure medium connection,
a second diaphragm valve, a surface running perpendicularly with respect to the second diaphragm valve arranged perpendicularly to the mid-axis of the through bore and parallel to the mid-axis of the pressure medium connection,
the two electromagnetic control valves having a double magnet with two magnet coils and two magnet armatures cooperating with solenoid valve seats and actuatable by current being applied to the two magnet coils, the two electromagnetic control valves providing pilot control of the two diaphragm valves,
the housing having the pressure medium connection, connected to a service brake valve, for acting with pressure upon and relieving the pressure of the pressure control valve arrangement and at least one working connection for connecting to the brake cylinder,
a coil plane of symmetry of the mid-axes of the two magnet coils of the double magnet of the two electromagnetic control valves being arranged parallel, and offset by the amount of an eccentricity (e), with respect to a mid-axis of the pressure medium connection, and
the housing being provided with the through bore which issues in side faces of the housing and is a holding means for holding the pressure control valve arrangement on a carrier body, the coil plane of symmetry of the mid-axes of the two magnet coils being arranged, offset by the amount of the eccentricity (e) with respect to a through bore plane of symmetry of the through bore, said through bore plane of symmetry being arranged perpendicularly to a mid-axis of the through bore.

10. The pressure control valve arrangement according to claim 9, further comprising: a first cover closing a pilot control space of the first diaphragm valve with respect to the outside and fastened to the housing.

11. The pressure control valve arrangement according to claim 10, wherein the first cover is composed of plastic.

12. The pressure control valve arrangement according to claim 10, characterized in that the first cover closes a pressure medium duct formed in the housing and separated from the respective pilot control space.

13. The pressure control valve arrangement according to claim 10, wherein a second cover closes a pilot control space of the second diaphragm valve with respect to the outside and fastened to the housing.

14. The pressure control valve arrangement of claim 9, wherein the pressure medium connection is provided for connection to the service brake valve of a pressure medium-actuated brake apparatus of a vehicle.

* * * * *